3,539,982
Patented Nov. 10, 1970

3,539,982

METHOD AND APPARATUS FOR CONSISTENT STATIC CORRECTION OF COMMON DEPTH POINT SEISMIC SIGNALS

James A. Hileman, Plano, and William Aippli Schneider, Peter Embree, and Milo M. Backus, Dallas, Tex. assignors to Texas Instruments Incorporated, Dallas, Tex., a corporation of Delaware Filed Mar. 3, 1969, Ser. No. 803,548
Int. Cl. G01v *1/36*
U.S. Cl. 340—15.5 27 Claims

ABSTRACT OF THE DISCLOSURE

Shot and receiver static corrections are determined for sets of common depth point seismic signals using crosscorrelations between each of the seismic signals and the average of the remaining seismic signals of the set. Correlation time delays are sensed and are arranged in an array corresponding to the shot-receiver relationships of the seismic signals. The correlation time delays related to a common shot and the time delays related to a common receiver location are each averaged to provide estimates of the shot and receiver static corrections. The appropriate shot and receiver corrections are combined to give consistent static corrections for each of the seismic signals.

This invention relates to seismic exploration, and more particularly to static corrections for common depth point seismic records through use of correlation delays for shot and receiver locations.

Common depth point (CDP) seismic exploration techniques are commonly utilized in the search for petroleum and other mineral deposits. In CDP exploration, a number of seismic traces are recorded which are characterized by spatial redundancy of the data, due to the common depth point geometry wherein sets of the seismic signals represent identical subsurface points but have differing shot and receiver locations. CDP exploration affords unique advantages in noise reduction and the like due to this spatial redundancy. A typical CDP seismic exploration operation is disclosed in U.S. Pat. No. 2,732,906 to Mayne.

In order to obtain meaningful data from CDP exploration, static corrections must be made on the seismic records to minimize errors due to near surface conditions such as weathering. A number of different techniques have heretofore been developed for producing static corrections for CDP records, many of which include crosscorrelating combinations of the seismic signals and time shifting the seismic signals relative to one another by time increments dependent upon the magnitudes of the correlation time delays. An example of such a technique is disclosed in the co-pending patent application Ser. No. 630,463, filed Apr. 12, 1967, by Embree et al. and entitled "Method and System for Seismic Record Alignment." Additionally, manual computation methods of static corrections, while generally accurate, have required long, tedious manipulations. A need thus presently exists for extremely accurate and rapid determination of CDP static corrections.

In accordance with the present invention, corrections for residual normal moveout are made on a set of seismic signals, after which crosscorrelation is conducted between each element of the set of seismic signals and the average of the remaining elements of the seismic signal set. Time intervals corresponding to amplitude peaks in the crosscorrelations are sensed according to preselected citeria. The time intervals related to a common shot are averaged to provide an indication of a surface consistent shot static correction and the time intervals which are related to a common receiver location are averaged to provide an indication of a surface consistent receiver static correction.

In accordance with another aspect of the invention, correlation signals representative of the crosscorrelation between the average of a plurality of seismic signals and each of the seismic signals are generated. Time intervals are sensed in the correlation signals at which amplitude peaks occur and fulfill preselected criteria. The time intervals are arranged in an array wherein time intervals corresponding to common shots are grouped in first sets and time intervals corresponding to common receiver locations are grouped in second sets. The first sets are then averaged to provide indications of surface consistent shot static corrections and the second sets are averaged to provide indications of surface consistent receiver static corrections.

In accordance with another aspect of the invention, peak values are sensed in correlation signals representative of the crosscorrelation between spatially redundant seismic signals. First signals are generated which are representative of the peak value occurring closest to the zero-lag reference line of each of the correlation signals. The first signals are utilized to determine the correlation time delays, unless other peak values are present which have an amplitude greater by a preselected factor than the amplitude of the peak value occurring closest to the zero-lag line.

In yet another aspect of the invention, static corrections are determined for a set of N common depth point seismic signals by generating N reference signals each representative of the average of a different combination of $N-1$ seismic signals. N correlation signals are then generated which are representative of the crosscorrelation between each element of the set of seismic signals and the reference signal generated from the remaining $N-1$ elements of the set. Indications are then generated of the receiver and shot static corrections in response to the correlation signals.

In accordance with still another aspect of the invention, N common depth point seismic signals are processed by generating correlation signals representative of the crosscorrelation bewteen the average $N-1$ seismic signals and each of the seismic signals. Indications are then provided of the time intervals in the correlation signals at which amplitude peaks occur. These indications of the time intervals are multiplied by a correction factor of $$N-1/N$$

For a more complete understanding of the present invention and for further objects and advantages thereof, reference is now made to the following description taken in conjunction with the accompanying drawings, in which:

FIG. 1 is a diagrammatic illustration of the occurrence of static time shifts in seismic exploration;

FIGS. 2*a–c* are diagrammatic illustrations of sequential shots in common depth point exploration;

Figures 8, 9, 10, 11:
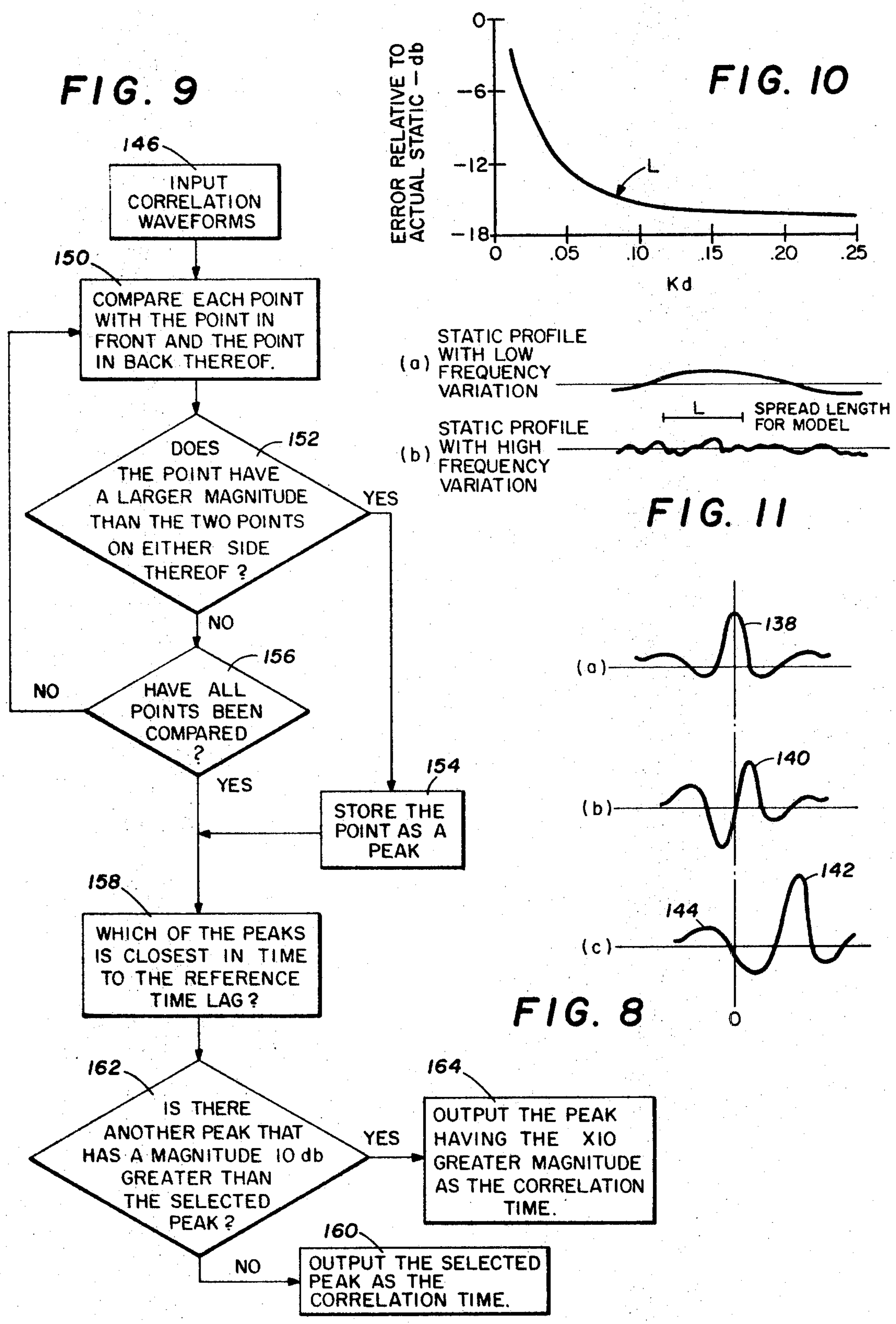

FIGS. 8*a–c* illustrate various correlation waveforms;

FIG. 9 is a flow diagram for picking the peaks of a correlation function according to the invention;

FIG. 10 is a graph illustrating possible errors in the present technique; and

FIGS. 11*a–b* are graphs illustrating the static profile with low and high frequency variations.

Figures 1, 2, 3:
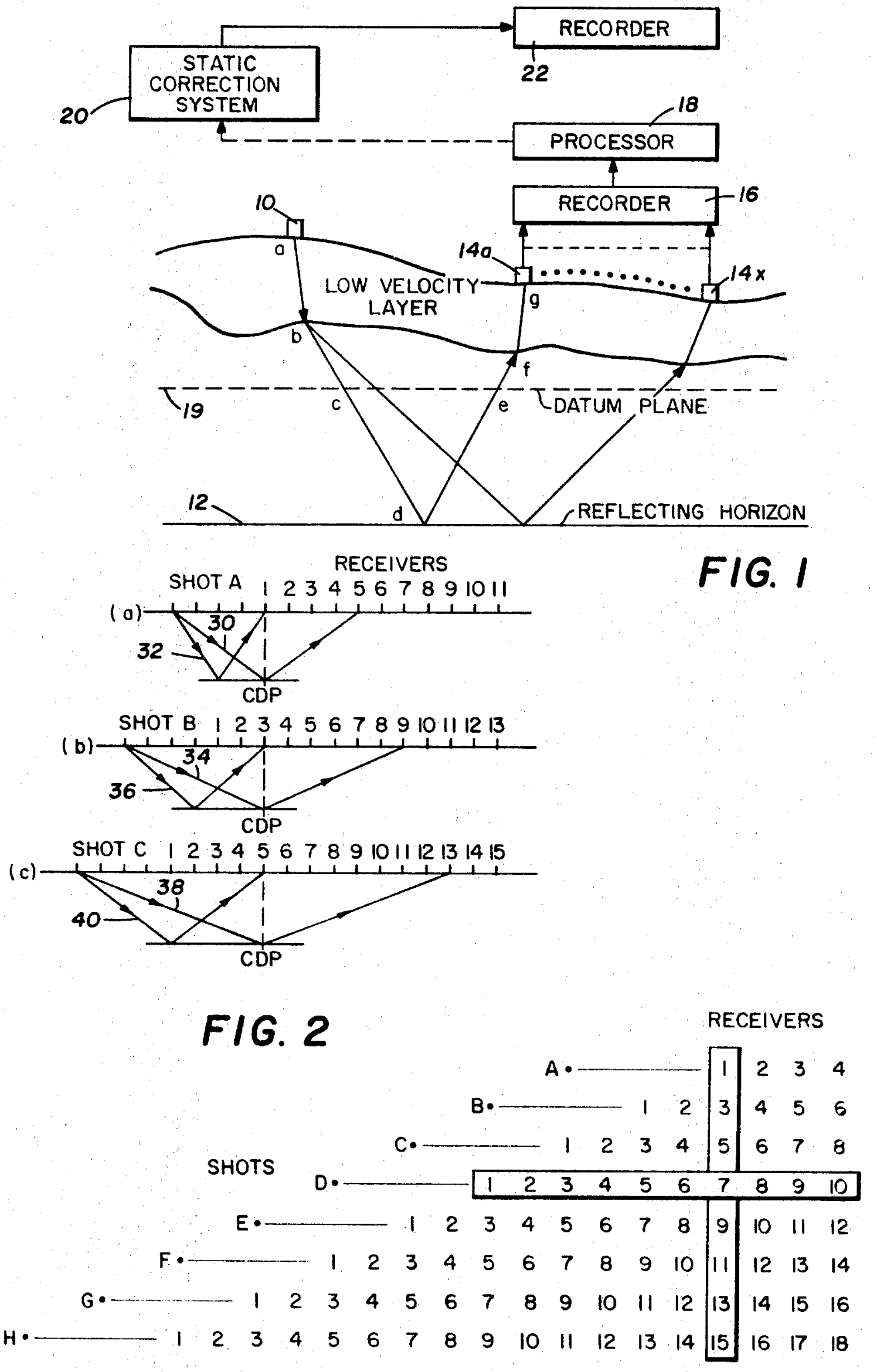
FIG. 3 is an array corresponding to respective shot and receiver locations in common depth point exploration.

FIG. 1 is a diagram of a seismic operation for common depth point exploration. A source of seismic impulses 10, such as a dynamite shot, generates seismic waves which travel through an irregular low velocity layer and then through higher velocity layers until reflection from a reflecting horizon 12. The seismic reflections are received by receivers or geophones 14*a–x*.

Although common depth point seismic exploration may be carried out utilizing a number of different surface geometries for the source and geophones, the operation illustrated in FIGS. 1–2 is the conventional off-end shot-spread geometry utilizing 24 geophones which is particularly useful for six-fold CDP subsurface coverage. As is described in the perviously identified patent to Mayne, operations at the surface involve locating shots at successively spaced stations while correspondingly moving the geophone spread. As will be later described in more detail, this CDP operation not only permits a continuous multiple coverage of a subsurface, but produces data with a large amount of spatial redundancy which may be advantageously operated upon by the present invention.

Static corrections are intended to remove irregular time delays caused by material between the surface and an arbitrary datum plane. The shot static correction will thus involve the travel time of the seismic wave from *a–c*, while the receiver static correction will involve the travel time from *e–g*. The static corrections according to the present invention are considered to be independent of the raypath angle of emergence. This assumption is not exactly accurate, but it is generally a satisfactory approximation, with significant exceptions generally occurring only when the base of the weathering layer is very irregular or very deep.

The outputs of the geophones 14*a–x* are recorded by a conventional recorder 16 to produce a seismogram containing data which is particularly related to the reflecting horizon 12, as well as other reflecting horizons which might be present. A processor 18 applies conventional a priori datum statics and other conventional processing techniques such as normal moveout corrections to the recorded seismic traces before the techniques of the present invention are utilized. These a prior statics are implemented to correct the data to a reference datum plane 19 using surface elevations, an appropriate near-surface velocity and uphold times if dynamite shots are utilized. These datum statics are conventionally practiced in seismic exploration, and do not solve the statics problem because of irregular changes in the thickness and velocity of the low-velocity layer. Plus and minus errors, or residual static corrections, relative to the datum plane still remain which must be corrected, as by the present invention, before meaningful data may be obtained from the seismogram. Even if preliminary datum statics are not applied by the processor 18, the present invention is still useful in that the statics determined thereby will be plus and minus corrections relative to a "floating" datum, such that alignment of the seismic signals is obtained with minimum time shifts.

The output of the processor 18 is generally recorded on magnetic tape or the like and transferred to a remote static correction system 20 according to the present invention. As will be later described in greater detail, system 20 may comprise a multi-component analog system utilizing conventional components. However, due to the complex nature of the operations to be performed according to the invention, the preferred embodiment of the invention utilizes a properly programmed digital computer such as the TIAC 827, manufactured and sold by Texas Instruments Incorporated of Dallas, Tex. The static corrected outputs from the static correction system 20 are recorded on a recorder 22 for use in additional data processing steps.

Although the techniques of common depth point seismic exploration are well known, FIGS. 2*a–b* illustrate the redundancy of data which occurs in common depth point exploration. The operation illustrated in FIG. 2 is that of a typical six-fold, off-end shooting geometry wherein twenty-four equally spaced geophones are linearly disposed and are spaced four geophone intervals from the shot position. For each succeeding shot the entire shot and geophone spread geometry is moved as a unit two geophone intervals away from the previous position. Thus, for each shot, twenty-four seismic traces are generated which have the same shot static, but with various receiver statics.

Specifically, the raypath 30 from Shot A is reflected from a subsurface CDP point and received by a geophone 5. A second raypath 32 is reflected and received by a geophone 1. The other raypaths emanating from Shot A, and the remainder of the twenty-four geophones, are not illustrated for simplicity of illustration.

Referring to FIG. 2*b*, the next Shot B is located at two geophone intervals to the left of Shot A, with the geophone array being also shifted two geophone intervals to the left. The raypath 34 emanating from Shot B is reflected from the illustrated CDP point and is received by geophone 9. The raypath 36 is reflected and received by geophone 3 which may be seen to occupy the same location as geophone 1 shown in FIG. 2*a*. Similarly, as shown in FIG. 2*c*, Shot C is located two geophone intervals to the left of Shot B, with the geophone array being also shifted accordingly. The raypath 38 is reflected off the CDP point and is received by receiver 13. The raypath 40 is reflected and received by geophone 5, which now occupies the same receiver location as geophones 1 and 3 occupied in prior shots.

An inspection of FIGS. 2*a–c* illustrates that geophones 1, 3 and 5 sequentially occupy the same receiver location, and therefore it is assumed for purposes of this description that these geophones have the same receiver static. In six-fold CDP shooting, twelve different seismic traces from twelve different shots will eventually be recorded at each geophone location and will thus have the same receiver statics.

The term "surface consistent," which will be used throughout the disclosure, implies that all seismic traces recorded from a single shot position will be affected by an identical shot static time shift. Similarly, all traces recorded at a given receiver position, but from different shots, will be affected by an identical receiver static time shift.

FIG. 3 is a numerical array illustrating the relative geophone positions in shot-to-shot operations in common depth point exploration. FIG. 3 thus represents the position of each shot with respect to the geophone array at that shot time. The array of FIG. 3 is particularly useful in illustrating geophone locations with common shot or receiver statics.

Each of the horizontal rows in the array contains geophone locations which have identical shot static, as each of these particular geophones receive reflections of signals from the same shot point. For example, the receivers illustrated in the shaded horizontal line opposite Shot D have the shot static associated with Shot D.

In a similar manner, the geophone locations in the vertical columns of the array have the identical receiver static, as each of these receivers sequentially occupy the identical location in the manner illustrated in FIGS. 2*a–c*. Specifically, the geophones 1, 3, 5, 7, 9, 11, 13 and 15 identified in the shaded vertical column each have the identical receiver static.

In essence, the present invention utilizes cross-correlation functions to measure the relative time shifts of each of the traces within a common depth point set. As is well-known, if a static-shifted seismic trace is crosscorrelated with a reference trace which is assumed to have no static shift, the location of the peak value of the correlation function will provide an estimate of the time shift of the static-shifted trace.

According to the invention, the measured time shifts for each trace are then placed in a numerical array according to the particular geophone locations in the manner shown in FIG. 3. The time shifts in each horizontal row of the array are then averaged to approximate the shot static for each particular shot. The time shifts located in each vertical column of the array are averaged to approximate the receiver static for the receiver location of each particular column.

The seismic trace signals before processing according to the invention are affected by shot static, receiver static, residual normal moveout and noise. For best results with the invention, conventional normal moveout corrections are made to the traces before processing with the present technique. After correlation of the traces, an additional bias correlation error is introduced into the trace signals. Corrections are then made to reduce the effects of the remaining residual normal moveout errors. After averaging of the correlation time shifts according to the array shown in FIG. 3, essentially only the shot or receiver statics are left as a final result, as the noise and bias errors are eseentially random effects which tend to average to zero.

Figure 4:
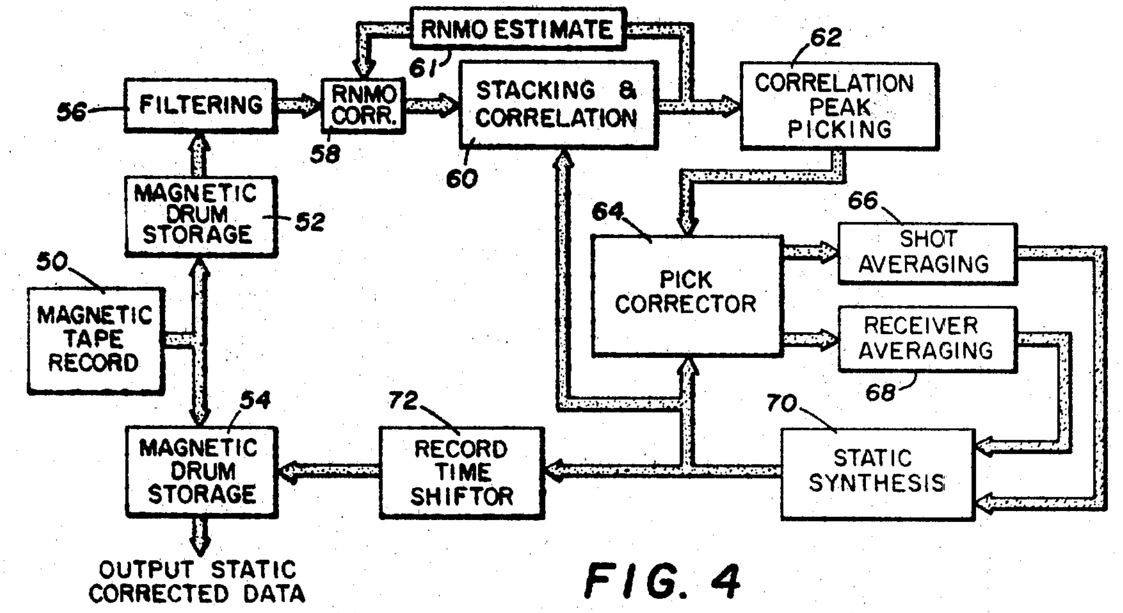
FIG. 4 is a block diagram of an embodiment of the invention.

Although the present invention is particularly adapted to performance on a digital computer, FIG. 4 illustrates a functional block diagram of major aspects of the invention which may be alternatively practived with conventional analog system components.

The magnetic tape record 50 contains all of seismic trace sets recorded from a continuous common depth point operation. Indications of the seismic signals are stored on conventional magnetic drum storage systems 52 and 54. The traces stored upon drum 52 are filtered at station 56 utilizing various conventional filtering techniques.

The filtered signals are corrected for residual normal moveout effects at station 58, it being understood that gross normal moveout corrections previously having been made. One system for accomplishing normal moveout correction is described in U.S. Pat. No. 3,092,805 to Keoijmans. The CDP data is then fed into a stacking and correlation processing station 60. Each seismic trace from a CDP set of N traces is crosscorrelated with the average of the remaining $N-1$ seismic traces of that set.

Crosscorrelation of seismic signals with reference signals is described in detail in the previously identified patent application Ser. No. 630,463, entitled "Method and System for Seismic Record Alignment." Other correlation systems are conventionally used in both analog and digital form. For example, analog correlation systems are described in connection with FIG. 4 of U.S. Pat. No. 2,794,965 to Yost and in U.S. Pat. No. 3,131,375 to Watson. In addition, an analog correlation system is described in Geophysics, vol XXVI, No. 3, in an article "An Analog Seismic Correlator" by Tullos et al.

While correlation between CDP seismic signals and reference signals has heretofore been known, the present invention advantageously utilizes the crosscorrelation of a seismic trace of an N set with the average of the remaining $N-1$ seismic traces in that set. With this technique, a bias error is introduced into the seismic signals due to the fact that the averaging of the signals does not produce an absolutely accurate reference signal for the crosscorrelation procedure. However, as will be later described, a correction factor is introduced into the signal to increase the accuracy of the crosscorrelation, and additionally such bias errors are generally random in nature and thus tend to average to zero in the later steps of the present technique.

The crosscorrelated signals are fed back to station 58 for an estimate of improved residual normal moveout corrections. This estimating procedure involves stacking common offset correlations to provide one averaged correlation for each of the twenty-four offsets. The average correlations are then time shifted according to various possible moveout relationships and summed. That moveout relationship which produces the largest peak correlation value in the sum is considered to define the remaining residual moveout correction. This RNMO correction is made at station 58.

Additionally, the crosscorrelated signals are fed to a conventional correlation peak picking station 62. Here, the correlation peaks having predetermined characteristics are selected in order to provide indications of the correlation time shifts for each of the seismic traces. A suitable mechanically operable peak picker system is described in the previously identified patent application Ser. No. 630,463, entitled "Method and System for Seismic Record Alignment." In this system, the search unit includes a storage unit represented by an oscilloscope which stores the values of the crosscorrelation of a particular channel at each of a plurality of time delays $\lambda$. The oscilloscope is a long persistence unit. A search detector supported on a follower includes a light-sensitive strip or line detector which spans the face of the oscilloscope. A light-sensitive point detector is mounted at one end of the strip. The detector is connected by way of an amplifier to a relay coil which operates a latching relay for de-energizing a motor which drives a screw on which the follower is mounted. Thus, as the motor drives the screw, the detector moves downward across the face of the oscilloscope. When it encounters the peak of the maximum crosscorrelation value, a pulse is produced by the detector which, when amplified, serves to actuate the relay coil latching the control switch for the motor to stop the downward traverse of the follower.

The screw is mounted on a follower which is driven on a screw by a selsyn receiver. The receiver is coupled to a selsyn transmitter which is driven mechanically in synchronism with the drum.

The point detector 193 is connected by way of an amplifier to a relay coil. The relay coil is connected to a switch. When the relay coil is energized, the switch is opened. Preferably, the switch will be a latching switch of the same type as in the energizing circuit for the motor. Thus, as the selsyn receiver drives the follower across a screw, the detector will encounter the crosscorrelation element of maximum amplitude. The resultant pulse generated by the detector applied to the relay coil, will open the switch. Indications of the correlation time delays are fed to station 64, wherein pick correction factors are introduced into the time intervals. These correction factors comprise a multiplication of each of the time intervals by the factor $$\frac{N-1}{N}$$

a factor which has been found to greatly increase the accuracy of the time intervals when the previously described crosscorrelation procedure is followed.

The corrected correlation time intervals are arranged in the array illustrated in FIG. 3, with the horizontal rows of the arrays averaged at a shot averaging station 66. Such averaging is conventionally done with a plurality of summing circuits. The correlation time shifts deposited in the vertical rows of the array are averaged at station 68 to provide indications of receiver static. Again, such averaging may be accomplished with the use of a plurality of conventional summers. The indications of the shot and receiver statics are synthesized at station 70 to provide combined surface consistent static signals.

In the broadest sense, such synthesis is accomplished by algebraically adding the receiver and shot static for each seismic trace. These indications of the combined statics for each seismic trace are fed to a record time shifter 72, which operates upon read heads conventionally disposed upon the magnetic drum 54 in order to shift the heads by increments indicative of the estimated static corrections. Additionally, the synthesized static corrections are fed back to the stacking and correlation station 60 and to the pick correction station 64, wherein additional correlation is provided in order to increase the accuracy of the static corrections.

The signals transduced by the shifted read heads on the magnetic drum 54 provide seismic traces which are shifted relative to one another according to the estimated surface consistent static corrections. Thus, each of the seismic traces common to a shot location is shifted according to the same shot static, while each of the seismic traces common to a certain receiver location are shifted to the same receiver static. Of course, in place of the mechanical shifting of seismic traces upon a pair of magnetic drums as shown in FIG. 4, a number of different types of conventional record shifting systems may alternatively be utilized. For instance, the ratchet unit and drum drive motor disclosed in the application Ser. No. 630,463, entitled "Method and System for Seismic Record Alignment," may be utilized.

Figure 5:
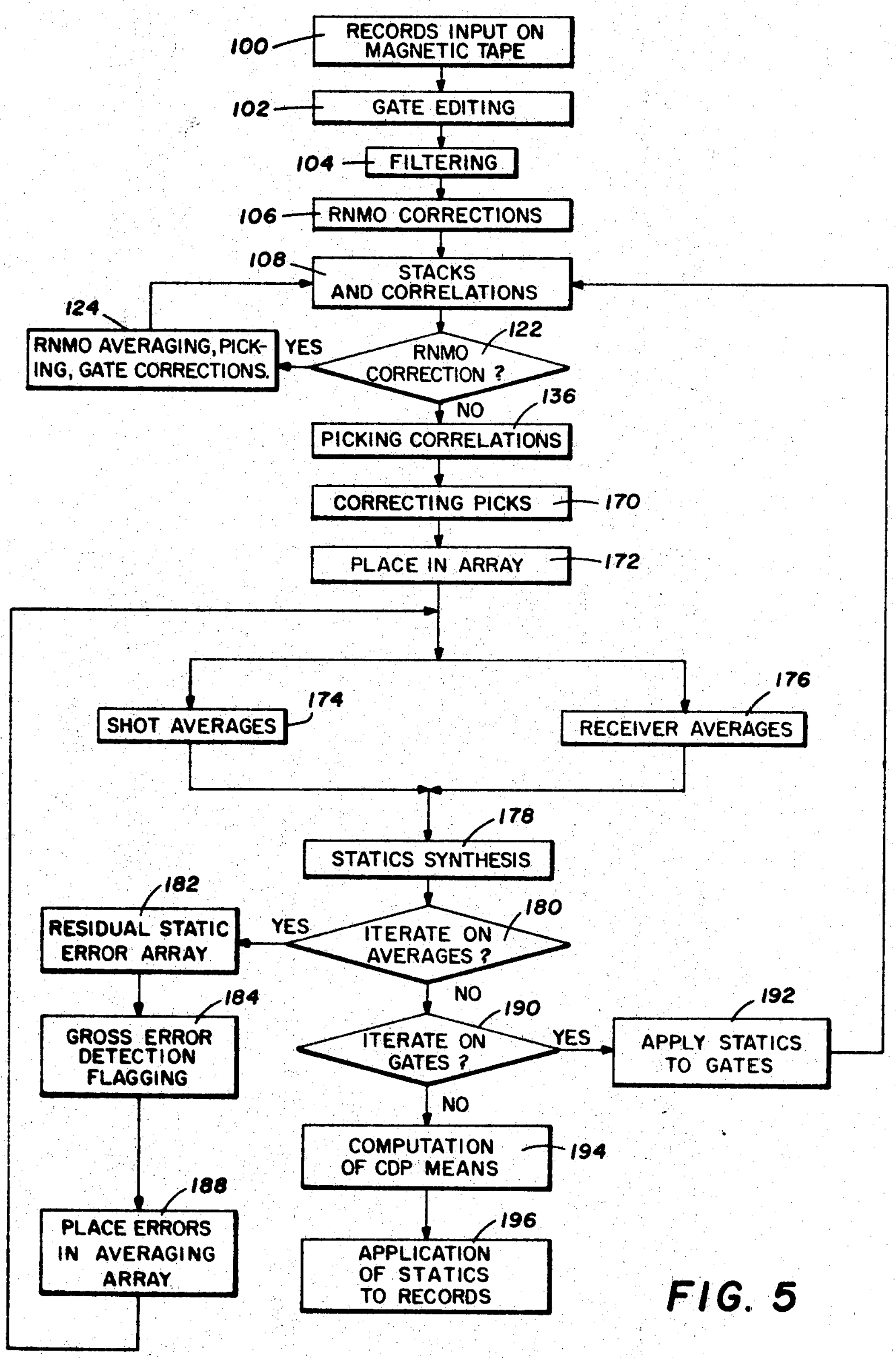
FIG. 5 is a flow diagram for the accomplishment of the invention on a digital system.

FIG. 5 is a flow diagram for the accomplishment of the present invention on a digital computer, such as the 827 TIAC digital computer manufactured and sold by Texas Instruments Incorporated of Dallas, Tex. A program package corresponding to this flow diagram is currently manufactured and sold by Texas Instruments Incorporated of Dallas, Tex., under the trade name "N-Fold Static Correction Package" No. PR-01-0266, for use with the 827 TIAC.

Seismic traces from common depth point exploration are processed by conventional techniques for normal movement and the like, and then recorded on tape and input into the properly programmed digital computer at 100. At 102, a time gate of data is selected, or edited, for use in the subsequent processing steps. In the 827 TIAC, this time gate is generally limited to a time interval of about 400 milliseconds. However, for a computer with larger capacity, larger time gates could be utilized. Portions of the seismic records which appear visually to contain interesting seismic data are generally picked by the operator for this time gate The gated seismic traces are filtered at 104 according to well-known digital filtering techniques. An example of a description of the theory of such digital filtering for seismic traces may be found in the article "Principles of Digital Filterings" by Robinson et al., Geophysics, vol. 29, pp. 395–404, and in many other publications and issued patents. Generally, a variety of filter bandpass responses will be available for the selection by the operator.

As previously noted, normal moveout corrections have previously been performed upon the record input to the computer. However, residual normal moveout (RNMO) errors will generally still remain in the data. Corrections in the residual normal moveout are then made at 106, the corrections being based upon input data which are estimates of residual normal moveout from past records.

The common depth point traces are stacked and correlated at 108. As previously described, each seismic trace in a CDP set is crosscorrelated with the stack of the remaining seismic traces of that set.

Figure 6:
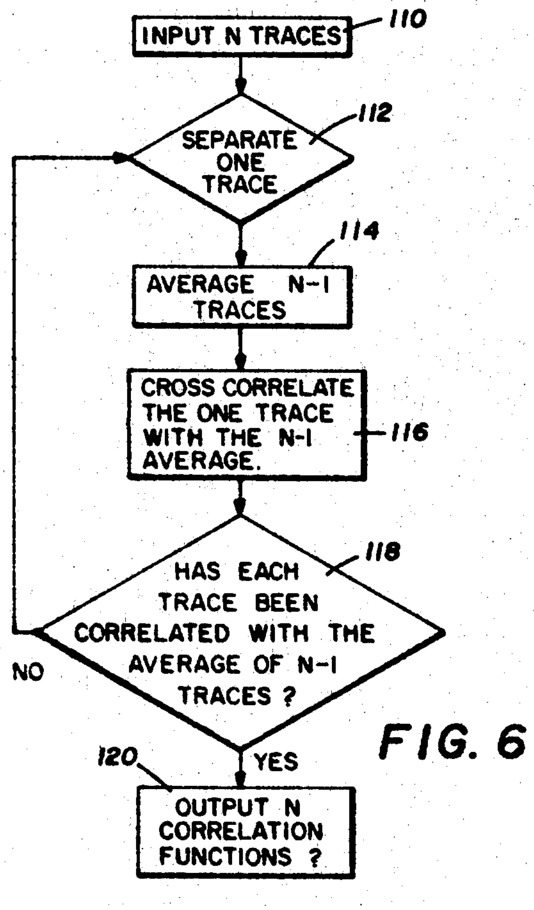
FIG. 6 is a flow diagram for the cross correlation of seismic signals according to the invention.

FIG. 6 illustrates in greater detail the correlation technique performed at operation 108. N seismic traces of a CDP set are input at 110. One seismic trace is separated at 112, thereby leaving $N-1$ traces which are averaged, as by stacking, at 114. The stacked $N-1$ traces thus serve as a reference signal for crosscorrelation with the separated trace at 116.

The crosscorrelation formed by the digital computer at 16 may utilize the technique disclosed in the copending patent application Ser. No. 550,314, entitled "Space Averaged Dynamic Correlation Analysis" to Backus et al. and in the previously described patent application Ser. No. 630,463. Basically, the technique comprises properly programming the computer for solution of the well-known crosscorrelation functions disclosed in these two disclosures.

A check is made at 118 as to whether or not each seismic trace of a CDP set has been correlated with the stacked reference traces. Reiteration is performed until each trace has been crosscorrelated with the average of the remaining $N-1$ traces. When each of the traces of a CDP set has been correlated according to the crosscorrelation function, the correlation functions are output at 120.

Returning to FIG. 5, a switch for reiterated residual normal moveout correction is sensed at 122. Generally, a single reiterated RNMO correction will be made at 124.

Figure 7:
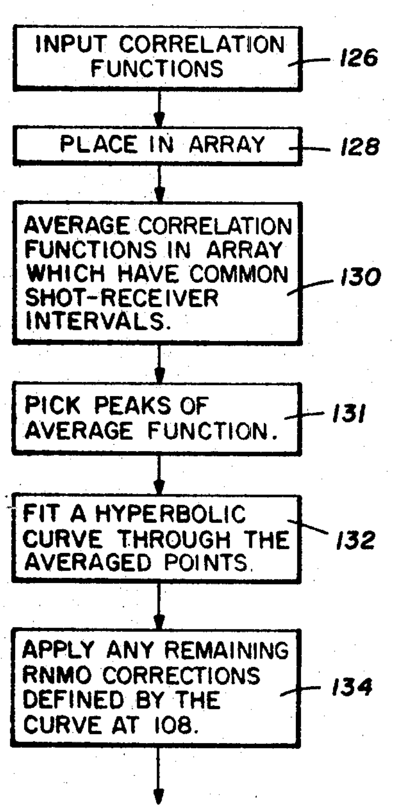
FIG. 7 is a flow diagram for residual normal moveout correction.

FIG. 7 illustrates in greater detail the residual normal moveout averaging, picking and gate correction operation indicated generally at 124. The correlation functions determined at 108 are input at 126 and are placed at 128 in an array corresponding to the trace relationships in the manner illustrated in FIG. 3. It may be shown that the residual normal moveout error is a systematic error, and that each of the errors located in the matrix shown in FIG. 3 along a diagonal line consisting of all the receiver locations designated as ones, or by twos, and so on, contains the same residual normal moveout. Additionally, each of the seismic traces associated with these locations contains receiver and shot statics and noise all of which tend to be random along these diagonals.

Thus, when the correlation functions are averaged at 130, these random errors tend to average to zero, thereby leaving only the residual normal moveout error. A plurality of residual normal moveout indications are provided at 131 by picking the peaks of each averaged correlation function. It is known that normal moveout error is well approximated by a hyperbolic curve. Hence, a hyperbolic curve is fitted to the averaged RNMO points at 132 to improve the accuracy of the technique. The residual normal moveout values determined by the points on the fitted hyperbolic curve are then utilized at 134 to correct the seismic traces being utilized for stacking and correlation at 108.

As previously noted, in actual practice, it has been found generally desirable only to execute residual normal moveout averaging and correction for one reiteration loop.

Referring again to FIG. 5, after correction for residual normal moveout, the peak values of the correlation functions are picked at 136. In a theoretical sense, the picking of the maximum of a correlation function is easily accomplished by picking the peak of maximum amplitude. As shown in FIG. 8*a*, the theoretical idealized crosscorrelation function curve 138 has its maximum at the zero-lag line of the function. However, in practice, due to noise and other variables such as the time shift being sought, the crosscorrelation functions tend to be somewhat distorted, thereby presenting problems in selecting the correct value as the crosscorrelation function maximum. Examples of such distorted crosscorrelation functions are illustrated in FIGS. 8*b–c*.

The present invention envisions an advantageous technique for picking the correct crosscorrelation maximum. The invention comprises selecting the peak of the correlation function which is closest to the zero-lag line of the function and denoting that peak as the maximum of the correlation function, unless another peak of the correlation function has an amplitude greater than the selected peak by a predetermined magnitude. In practice, a magnitude of 10 db has been found to work well.

As an example of the operation of the technique, the peak denoted as 140 in FIG. 8*b* is chosen as a maximum of the correlation function, as the peak is closest to the correlation lag line and is substantially greater than any other amplitude peak of the function. Alternatively, the peak denoted by 142 will be chosen as a maximum of the correlation in FIG. 8*c*, although the peak 142 is not as close to the lag line as the peak 144. This result occurs due to the fact that peak 142 has an amplitude at least 10 db greater than the peak 144.

FIG. 9 illustrates in detail the operation of the present technique at 132. The correlation function waveforms are input at 146. Each waveform is represented by M points, with each of the points representing a magnitude of the waveforms at a particular time. In practice, the correlation waveforms have been digitized into twenty-one points evenly spaced in time. Each of the points is compared at 150 with the point occurring on either side thereof along the time scale. If the point is determined to be larger than the two other points at 152, it is determined that the particular point is a peak and that point is thus stored at 154. An example of the programming of a digital computer for digital peak picking is described in U.S. Pat. 3,075,607, issued Jan. 29, 1963 to Aitken et al.

This process is continued until it is determined at 156 that all of the points have ben compared and thus that each of the peaks in the correlation function has ben determined. The time intervals between each of the stored peaks and the zero-lag line of the correlation function are determined at 158, with the shortest time interval being determined. The peak having the shortest time interval is output at 160 as the maximum of the correlation function, unless it is determined at 162 that another peak exists that has a magnitude 10 db greater. In the case of the occurrence of such a larger amplitude peak, that peak is output at 164 as denoting the maximum of the correlation function.

Returning to FIG. 5, after the maximum of each of the correlation functions has been determined, the time interval between the zero-lag line and the maximum of the correlation functions is corrected at 170. As previously described, this correction involves the multiplication of each time interval by the factor $$\frac{N-1}{N}$$

with N being the number of traces in the CDP set. It has been determined that correction by this factor provides a superior result in the estimation of static corrections for common depth point exploration.

After corrections of the time intervals, the time intervals are placed on an array similar to that shown in FIG. 3 at 172. This step will conventionally be carried out in the computer by magnetic storage techniques. The horizontal lines of the array are averaged at 174 to provide indications of the shot statics in the manner previously described. The vertical columns in the array are averaged at 176 to provide indications of the receiver statics in the manner previously described. This averaging eliminates the random noise and bias errors while extracting the non-random statics.

The static corrections for each location in the array are synthesized at 178 by combining the determined shot and receiving statics. Generally, this comprises the addition of the shot and receiver static for each point in the array. An iteration decision is made at 180, with several iteration loops generally being utilized in practice. If the iteration decision is made, the estimated static corrections synthesized at 178 are subtracted at 182 from the correlation time intervals determined at 136. Assuming that the correlation pick was correctly made, it will be expected that each of the remaining numbers from the subtractions would be relatively small.

These numbers are then inspected at 184, and if a relatively large number is detected, that number is flagged at 184 and is not used in later computations. The errors at this point which are flagged are termed the gross static errors. Flagged terms are automatically passed over in subsequent averaging to provide a more accurate indication of the statics for the system.

If a decision is made at 180 to again reiterate, the reprocessed synthesized statics are removed from the correlation times at 182, and the number magnitudes are again inspected at 184. There will still remain some uncorrected errors at this point. These uncorrected errors are placed in a averaging array at 188 in the manner shown in FIG. 3. The resulting improved signals are looped back and utilized in shot and receiver averages at 174 and 176. This looping technique may be repeated and repeated until a desired accuracy is obtained.

After the desired number of reiterations, a decision is made at 190 as to an iteration on the gates. Generally, at least two to three iteration loops are applied at this point. The static corrections determined at 178 are applied to the edited gates at 192 and the static estimation procedure is restarted beginning with the stacking and correlation at 108. This reiteration loop produces a new set of static corrections of improved accuracy.

After the desired number of loops at 190, the means value of the correlation time shifts for each of the traces in the particular CDP set are computed at 194. This serves as a quality control feature, as if the mean value thus computed is not below a predetermined magnitude, some error has probably occurred. Interpretive steps must be undertaken to eliminate this source of error.

The finally computed shot and receiver statics determined with respect to the particular gate are applied to the entire record at 196, thereby resulting in coherent records which facilitate seismic exploration.

FIGS. 10 and 11 illustrate typical results obtained from model study and processing of CDP field data with the invention. Results from the invention have been found to be comparable with the application of exact statics in model testing, with the exception of very slowly changing static shifts. This insensitivity to slowly changing statics does not significantly affect the excellent results provided by the invention.

An acutal static correction profile may be considered as a time series, and its rapidly or slowly changing components as high or low frequencies. The error provided by the present invention in estimating the actual statics may then be represented as error spectrum shown in FIG. 10 in which the power of the error is plotted against the spatial frequency of the static profile. The curve illustrated in FIG. 10 is a smoothed version of the actual error curve. K is the wave-number in cycles-foot and *d* is the distance in feet between shot points. For short wavelengths, when K*d* is greater than 0.1, the power in the error is −12 db to −18 db relative to the true static. In other words, the estimated results have an error of about 15%. At long wavelengths, when K*d* is less than 0.1, this error increases substantially.

The behavior illustrated in FIG. 10 may be understood considering the two static profiles shown in FIGS. 11*a* and *b*. Each of these two profiles is to be estimated according to the invention utilizing data obtained over an interval L which is the length of a recording spread. The wavelength corresponding to L is indicated by the arrow on the error spectrum shown in FIG. 10. For low frequency variations, there is very little information specifying those variations within the interval L, and the resulting estimate is thus relatively poor. However, when the variation is a high frequency, sufficient information is provided and thus the estimate according to the invention is good. In a low frequency limit, when the static problem is simply a constant time shift on all traces, there are little variations measured from the traces and the constant time shift cannot be accurately detected. The relative time shifts as measured by the cross-correlation functions will then be zero.

By properly programming an 827 TIAC computer with the previously described "N-Fold Static Correction Package" No. PR–01–0266, the computer will compute and list on-line the set of consistent residual static corrections according to the invention. Additionally, the routine will compute, and list on-line, the mean static for each CDP set. If the user desires, the routine will apply the computed static corrections to the records, with the option to correct the common depth point sets to a zero mean. This routine is designed to accept the following spread configurations:

(a) Shot off-end where the direction of progression is toward either trace 1 or trace 24.
(b) Shot between two consecutive traces with the direction of progression being toward either trace 1 or trace 24, with no gap between the two consecutive traces (i.e., gapped splits are not acceptable).
(c) Fold may be 3, 4, 6 or 12.

The following assumptions are also made:

(a) Consistent datum static corrections based on uphole, elevation, etc. have been applied.
(b) Residual static corrections have a random distribution with zero mean.

A band-pass filter, selected from a set of twenty-four 21-point, zero phase filters built into the routine, will be applied to the correlation gate if desired. Static corrections are picked to the nearest millisecond and listed online in two convenient formats. The shot static and $12/N$ group statics are listed for each input record in addition to the net static correction for all twenty-four traces for each record.

The present invention has thus been described with respect to both an analog embodiment thereof and with respect to utilization on a properly programmed digital computer. The invention has also been described specifically with respect to common depth point exploration, but the technique could be utilized with other types of exploration having the desired redundant spatial characteristics.

Although the invention has been described with respect to several specific embodiments thereof, it will be understood that various changes and modifications will be suggested to one skilled in the art and it is desired to encompass those changes and modifications as fall within the scope of the appended claims.

What is claimed is:

1. A system for determining and applying static corrections to seismic signals having spatial redundancy comprising:
(a) means for generating reference signals representative of the average of at least a portion of said seismic signals,
(b) means for generating a plurality of correlation signals representative of the crosscorrelations between said reference signals and each of said seismic signals,
(c) means for sensing the time intervals in said correlation signals at which preselected amplitude peaks occur,
(d) means for averaging said time intervals which are related to a common shot,
(e) means for averaging said time intervals which are related to a common receiver location, and
(f) means for generating consistent static correction signals in response to the averaging of said time intervals.

2. The system of claim 1 wherein said seismic signals are obtained from common depth point exploration.

3. The system of claim 1 and further comprising:
means for correcting said signals for residual normal moveout prior to the generation of said correlation signals.

4. The system of claim 1 wherein said means for generating reference signals comprises:
means for averaging $N—1$ seismic signals of a set of N signals.

5. The system of claim 4 and further comprising:
means for correcting said correlation signals by a factor of $$\frac{N-1}{N}$$

6. The system of claim 1 wherein said preselected amplitude peaks comprise the peaks closest to the zero-lag lines of the correlation functions and having a preselected relative amplitude.

7. The method of operating an automatic electrical system for determining consistent static corrections for seismic signals characterized by spatial redundancy comprising:
(a) generating electrical reference signals representative of the average of at least a portion of said seismic signals,
(b) generating a plurality of electrical correlation signals representative of the cross-correlations between said reference signals and each of said seismic signals,
(c) sensing the time intervals in said electrical correlation signals at which preselected amplitude peaks occur,
(d) averaging said time intervals which are related to a common shot,
(e) averaging said time intervals which are related to a common receiver location, and
(f) automatically generating static correction signals in response to the averaging of said time intervals, said static correction signals being uniform for each seismic signal with a common shot location and for each seismic signal with a common receiver location.

8. The method of claim 7 wherein said seismic signals are obtained from common depth point exploration.

9. The method of claim 7 and further comprising:
correcting said seismic signals for normal moveout prior to the generation of said correlation signals.

10. The method of claim 7 wherein said step of generating reference signals comprises:
averaging N different combinations of $N—1$ seismic signals from a set of N seismic signals.

11. The method of claim 7 wherein said step of sensing time intervals comprises:
sensing the peak in each correlation signal closest to the time lag line of the correlation signal which has an amplitude above a preselected criteria, and
generating an indication of the time interval between said peak and said lag line.

12. The method of claim 7 wherein said static correction signals are corrected for gross errors and said steps (a)–(f) then repeated.

13. The method of claim 7 and further comprising:
averaging said correlation signals which have common residual normal moveout errors,
correcting said seismic signals according to said averaging, and
repeating steps (a)–(f).

14. The method of claim 13 and further comprising:
fitting said averages of the residual normal moveout errors to a hyperbolic curve, and
correcting said seismic signal according to said curve.

15. The method of processing common depth point seismic signals by causing an automatically operable system to perform steps comprising:
(a) generating correlation signals representative of the cross-correlation between the average of a plurality of said seismic signals and each of said seismic signals,
(b) sensing the time intervals in said correlation signals at which preselected amplitude peaks occur,
(c) arranging said time intervals in an order corresponding to the particular common depth point shot receiver relationship in which the respective seismic signals were obtained, time intervals corresponding to common shots being grouped in first sets and time intervals corresponding to common receiver locations being grouped in second sets, and (d) averaging said time intervals in said first sets to obtain indications of shot static corrections for said seismic signals and averaging said time intervals in said second sets to obtain indications of receiver static corrections.

16. The method of claim 15 and further comprising: correcting said seismic signals for normal moveout prior to the generation of said correlation signals.

17. The method of claim 16 and further comprising: averaging ones of said time intervals having common normal moveout errors, and correcting said seismic signals according to said averaging.

18. The method of claim 15 and further comprising: adding said shot and receiver static corrections for each respective receiver location.

19. The method of claim 18 and further comprising: generating signals representative of the mean of said static corrections, and eliminating ones of said static corrections greater than said mean by a predetermined factor.

20. In the method of determining static corrections for common depth point seismic signals with the use of an automatically operable system, the combination comprising:

(a) generating correlation signals representative of the cross-correlation between the average of a plurality of said seismic signals and each of said seismic signals, (b) detecting peak values of said correlation signals, (c) generating first signals representative of the peak value occurring closest to the reference lag line of each said correlation signal, (d) generating second signals representative of any peak values having an amplitude which is greater by a preselected factor than the amplitude of the peak value occurring closest to the lag line, and (e) generating indications of the time intervals in said correlation signals at which said first signals occur unless said second signals are generated.

21. The method of claim 20 wherein said preselected factor comprises ten decibels.

22. The method of processing N seismic signals by causing an automatically operable system to perform the steps comprising:

(a) generating correlation signals representative of the crosscorrelation between the average of $N-1$ seismic signals and each of said seismic signals, (b) generating indications of the time intervals in said correlation signals at which preselected amplitude peaks occur, and (c) multiplying said indications by the correction factor $$\frac{N-1}{N}$$

23. The method of claim 22 wherein averages of different combinations of $N-1$ seismic signals are crosscorrelated with each said seismic signal.

24. The method of claim 22 wherein said seismic signals are obtained from common depth point exploration.

25. The method of determining static corrections for N common depth point seismic signals with the use of an automatically operable system comprising:

(a) generating N reference signals each representative of the average of a different combination of $N-1$ seismic signals, (b) generating N correlation signals representative of the cross correlation between each of said seismic signals and the one of the N reference signals which did not utilize the respective seismic signal, and (c) generating indications of receiver and shot static corrections in response to said correlation signals.

26. The method of claim 25 and further comprising: determining time delays in each said correlation signal, arranging said time delays in an array corresponding to the shot and receiver location in which said correlation signals were obtained, and averaging said time delays.

27. The method of claim 26 and further comprising: averaging first sets of said time delays having common shot static, and averaging second sets of said time delays having common receiver static.

References Cited

UNITED STATES PATENTS 3,223,967 12/1965 Lash -------------- 340—15.5

RODNEY D. BENNETT, Jr., Primary Examiner

D. C. KAUFMAN, Assistant Examiner